Figure 1:
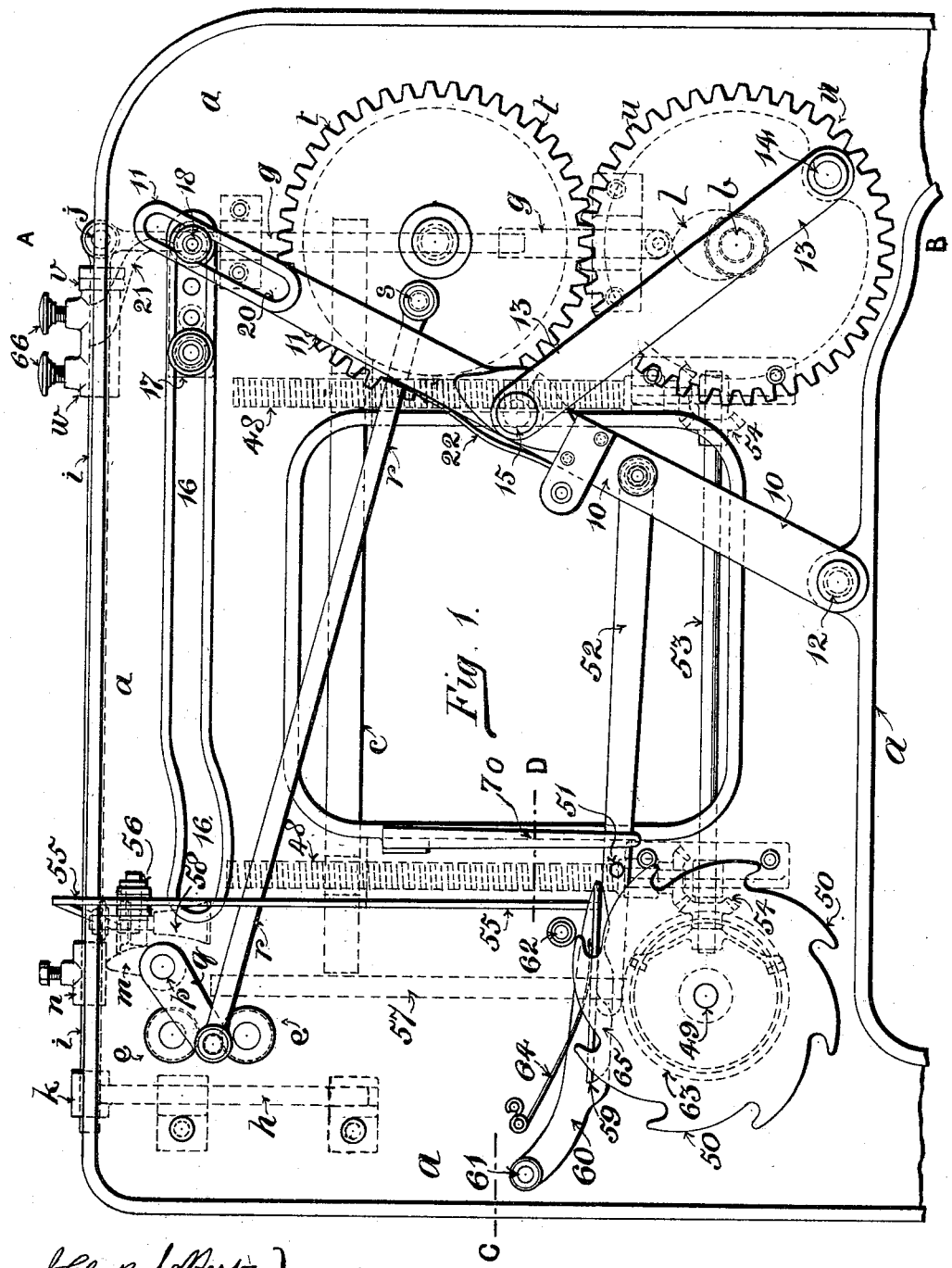

No. 632,268. Patented Sept. 5, 1899.
W. KERSHAW.
APPARATUS FOR FEEDING SHEETS OF PAPER.
(Application filed Jan. 6, 1899.)

(No Model.) 7 Sheets—Sheet 1.

Witnesses: J. Clark Jefferson, Jno Arthur Pinker

William Kershaw, Inventor

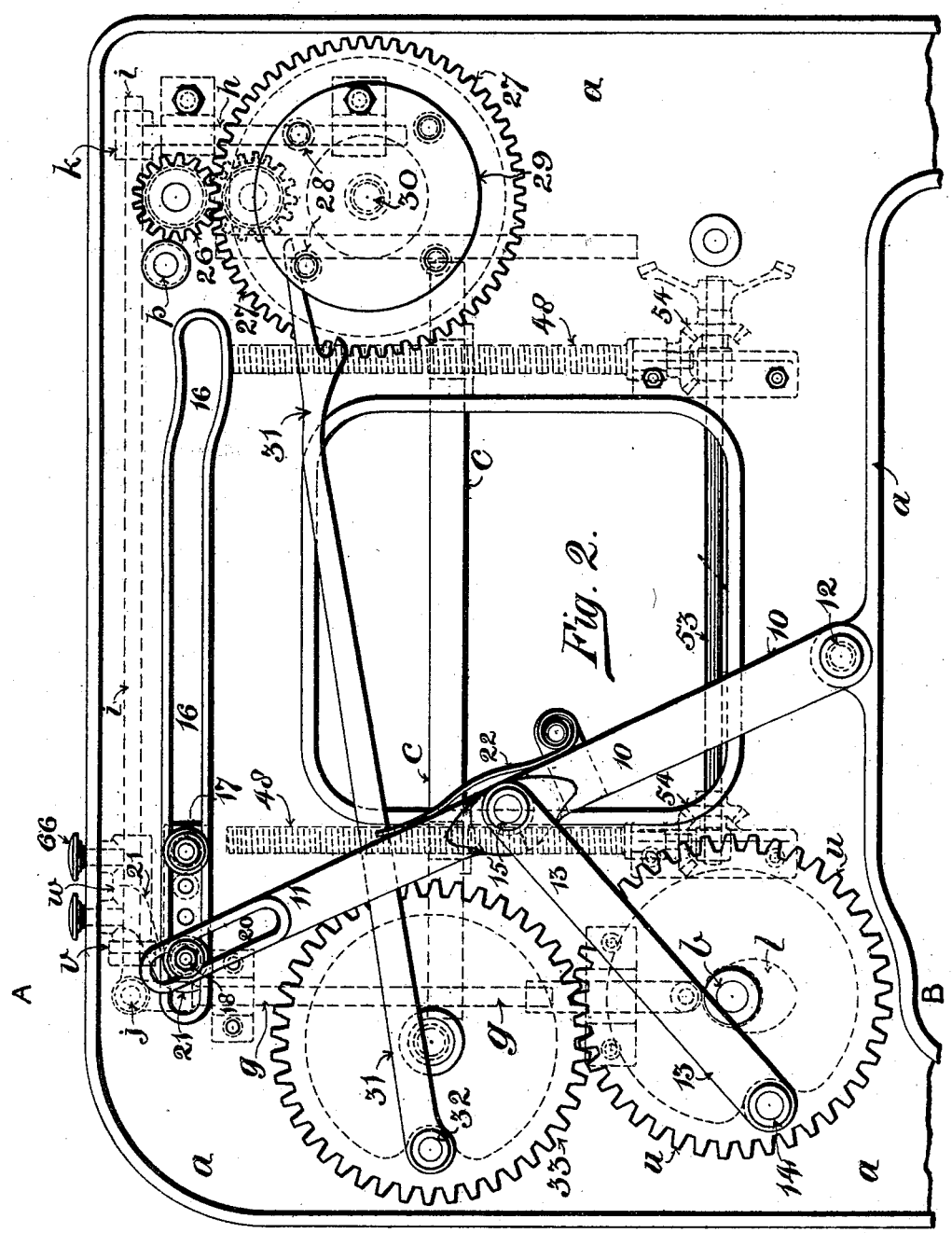

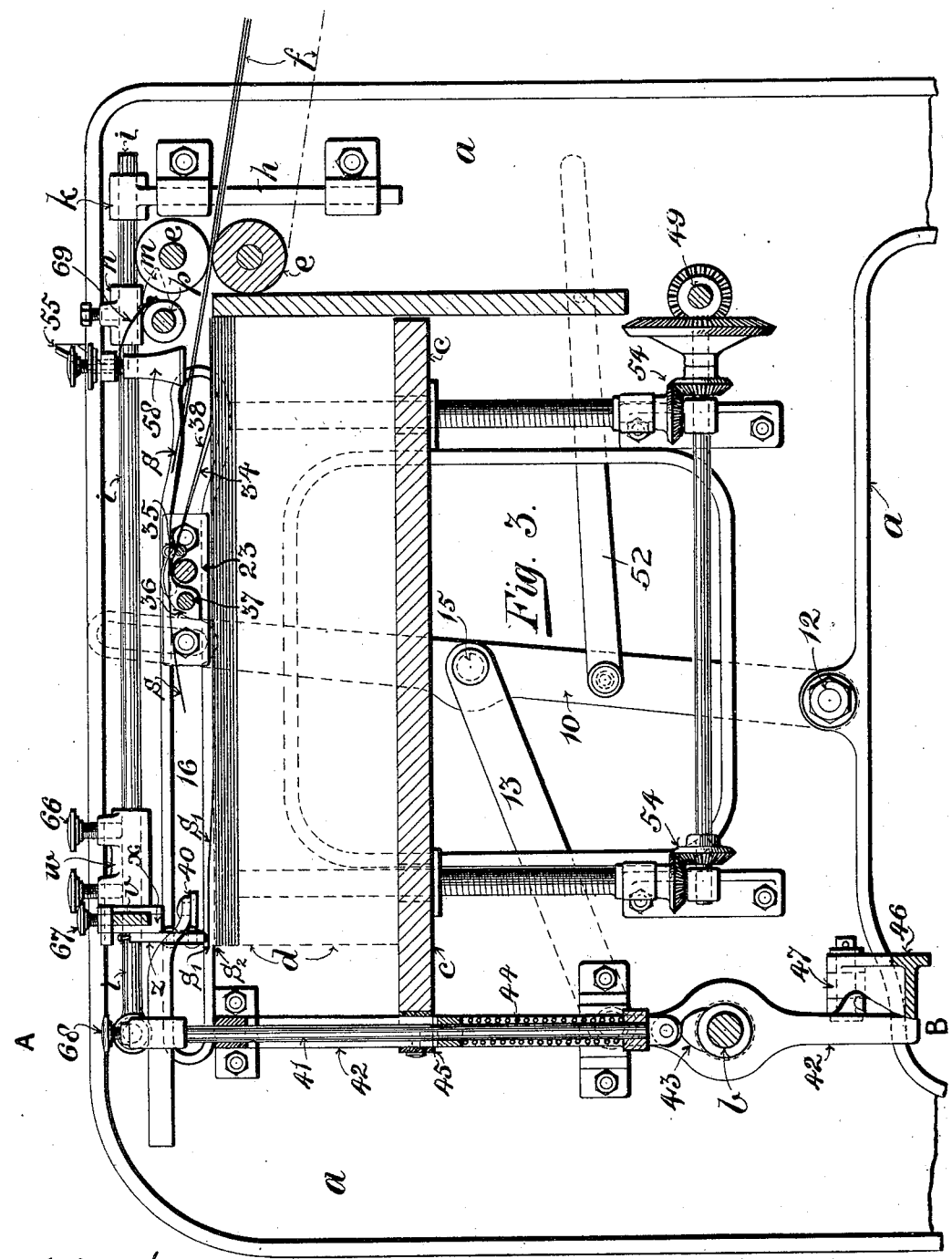

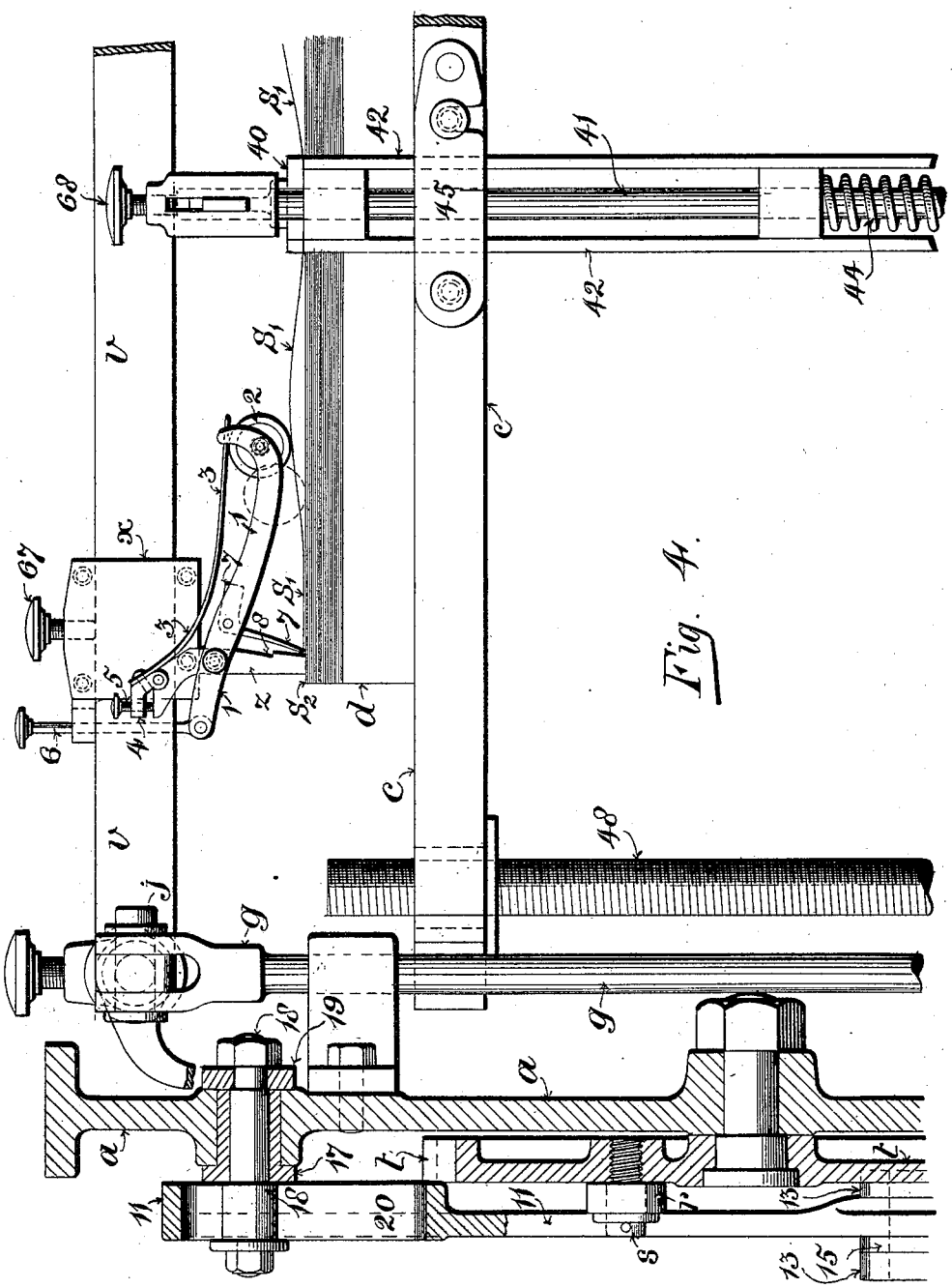

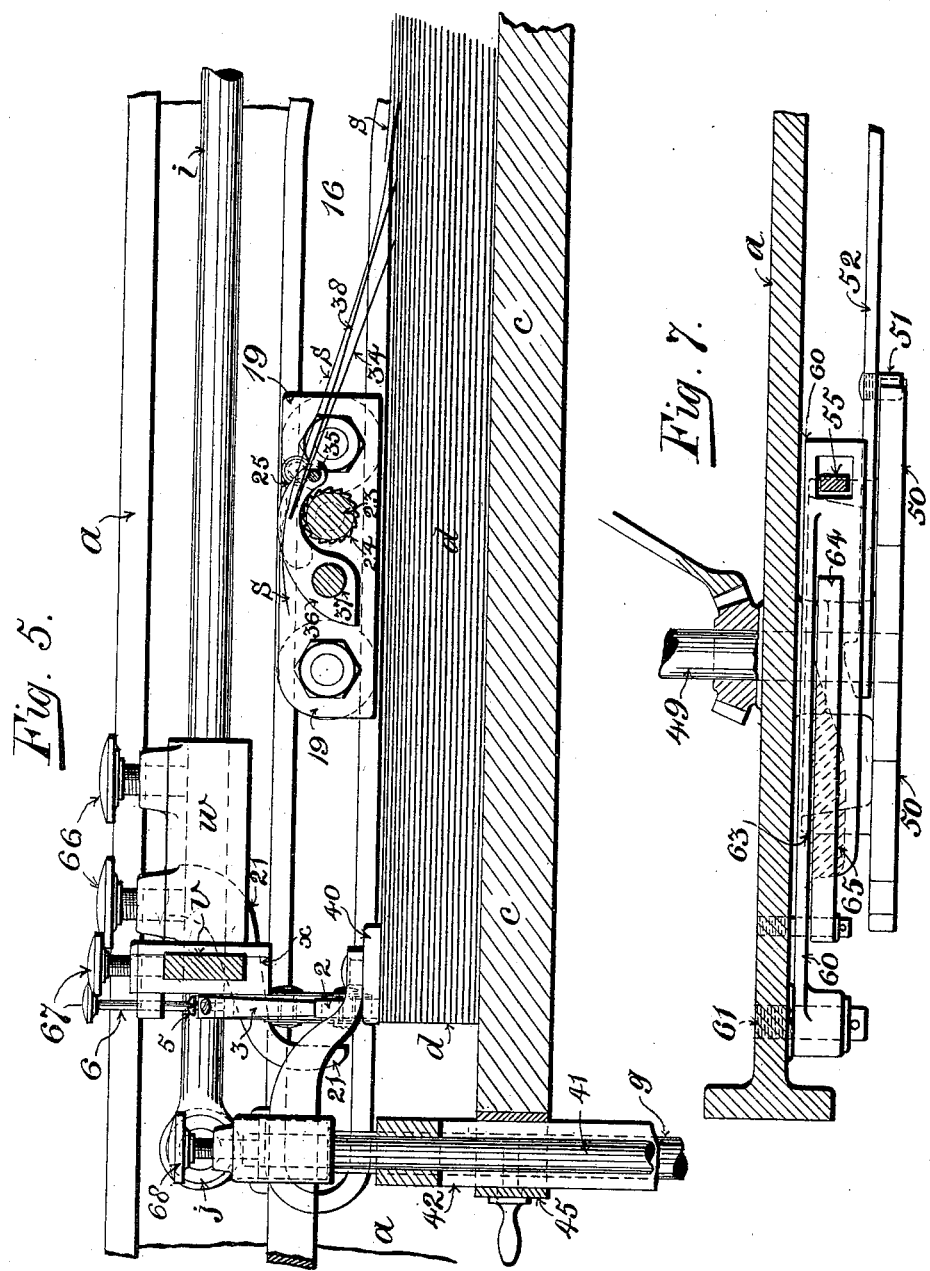

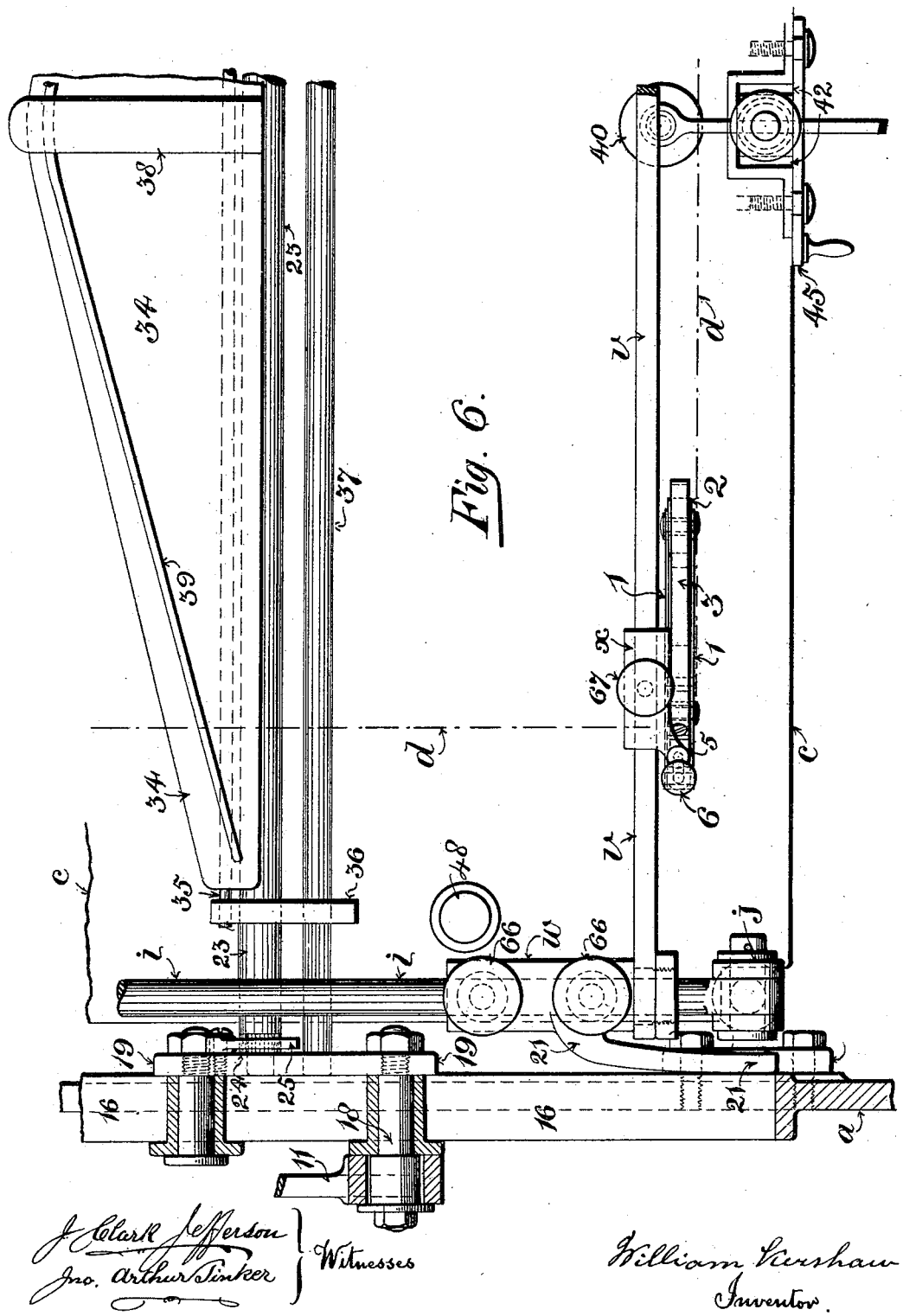

No. 632,268. Patented Sept. 5, 1899.
W. KERSHAW.
APPARATUS FOR FEEDING SHEETS OF PAPER.
(Application filed Jan. 6, 1899.)
(No Model.) 7 Sheets—Sheet 7.
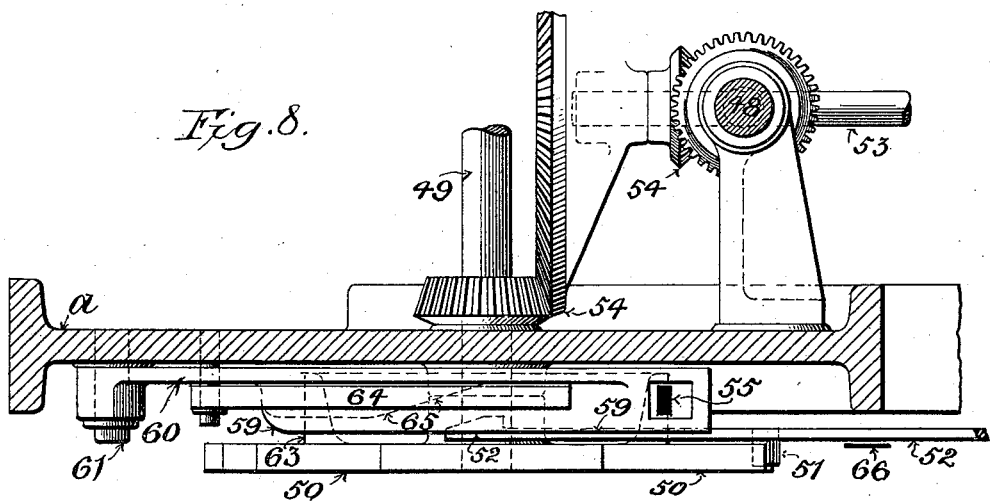
Fig. 8.
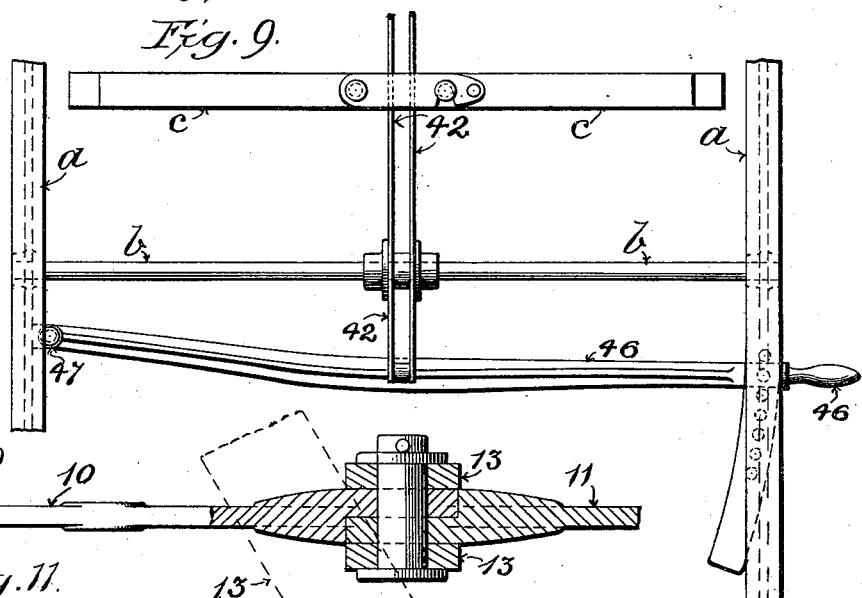
Fig. 9.
Fig. 10.
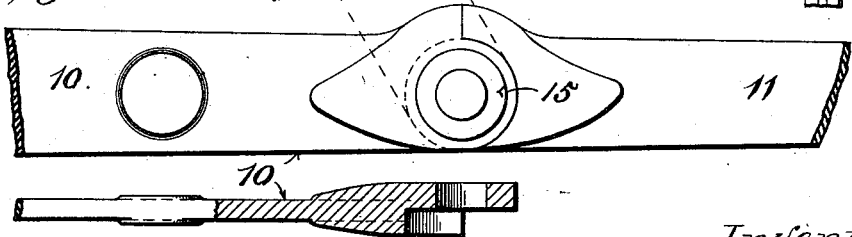
Fig. 11.
Fig. 12.
Witnesses:
John Enders Jr.
George M. Richards
Inventor
William Kershaw,
by W. H. Babcock
Attorney

UNITED STATES PATENT OFFICE.

WILLIAM KERSHAW, OF LEEDS, ENGLAND.

APPARATUS FOR FEEDING SHEETS OF PAPER.

SPECIFICATION forming part of Letters Patent No. 632,268, dated September 5, 1899.

Application filed January 6, 1899. Serial No. 701,380. (No model.)

*To all whom it may concern:*

Be it known that I, WILLIAM KERSHAW, a subject of the Queen of Great Britain and Ireland, residing at Leeds, in the county of York, England, have invented a certain new and useful Improvement in Apparatus for Feeding Sheets of Paper and Similar Material to Printing, Ruling, Calendering, and the Like Machines, of which the following is a specification.

The object of this my invention is to feed sheets of paper and similar material, hereinafter for the sake of brevity referred to as "paper," singly sheet by sheet from a pile of sheets to printing, ruling, calendering, and the like machines, hereinafter similarly referred to as "printing-machines."

My invention attains the above end by effecting a partial separation of the topmost sheet of the pile at the rear end—that is, at the end farthest from the printing-machine—while the forward movement of the topmost sheet to complete its separation is effected by drawing forward the sheet from its front end, and also so that the sheets are moved or fed forward through the feed-rollers in a fanned-out or overlapping manner. The object of drawing the sheet forward in place of pushing it forward is to avoid the liability or risk, which more particularly exists with thin and very flexible descriptions of paper, of the bending or buckling of the sheet, which often results in the sheets being twisted sidewise or in two sheets being fed forward together. The object of feeding the sheets in a fanned-out or overlapping manner is to reduce the speed of the forward movement of the sheets, since during each revolution of the printing-cylinder they then require to move only a fraction of the total distance from the pile to the printing-cylinder. Otherwise the full distance has to be moved at each revolution of the printing-machine.

By my invention I effect a combination of the pulling forward of the topmost of the unseparated sheets and the fanned-out or overlapping manner of carrying forward the sheets by causing the pulling-forward device to enter at the back beneath the last or bottom of the partially separated and fanned-out sheets and above the topmost of the undisturbed sheets and to move forward above and out of contact with the topmost of the undisturbed sheets until it approaches the forward end of the sheet, when the pulling-forward rollers or rubbers drop upon said sheet and pull it forward during the remainder of the forward movement up to and into the grip of the feed-rollers, the partial separation of the back of the sheet so as to lay hold and prevent any premature movement of the second sheet, taking place during the latter part of the backward and the first part of the forward movement of the pulling device.

Like the majority of feeding apparatus, my invention comprises means for bending or buckling up the corners of the topmost of the undisturbed sheets, means for holding down the corners and back of the next sheet thus exposed, means for drawing forward the top sheet of the pile and carrying it up to the printing-cylinder, and, lastly, means for automatically raising the table as the height or thickness of the pile diminishes, all arranged to operate at the proper times and adjustable to suit various sizes of sheets. These means, constituting a feeder for printing-machines, are illustrated in the accompanying drawings, in which—

Figure 1 is an outside elevation of the left-hand side of the feeder. Fig. 2 is an outside elevation of the right-hand side of the feeder, the terms "right" and "left" hand referring to a position at the back of the machine. Fig. 3 is a longitudinal vertical mid-section. Fig. 4 is a half cross-section on line A B of Figs. 1 to 3. Fig. 5 is an enlarged view of part of Fig. 3, showing the inner side of the sliding blocks 17 and attachments; and Fig. 6 is a plan corresponding to the same. Fig. 7 represents some of the feeding devices, partly in plan and partly in horizontal section, for the most part corresponding to line C of Fig. 1 and to Fig. 8. Fig. 8 represents a horizontal section on the line C D of Fig. 1 of that part of the machine which includes the devices for controlling the upward feed of the pile. Fig. 9 represents a detail side elevation of the locking-lever 46 and the proximate parts. Fig. 10 represents a detail view, in longitudinal section, of the jointed ends of the parts 10 and 11, the hinge-pintle being shown in elevation. Fig. 11 represents a detail plan view of the said parts and hinge. Fig. 12 represents a detail view of the said part 10 alone, the same being shown as in Fig. 10.

$a$ are the side frames of the machine.

$b$ is the main driving-shaft, driven by any convenient means at the same speed as the printing-machine.

$c$ is the table on which the pile of sheets $d$ are placed.

$e$ are the feed-rollers, and $f$ the carrying-tapes for carrying the separated sheets up to the impression-cylinder of the printing-machine.

The mechanism for buckling up the back corners of the top sheet comprises two long vertical side rods $g$ and two short vertical side rods $h$, to which the horizontal side rods $i$ are attached at the back end by pin-joints $j$ and at the front end by socket-joints $k$. These are all raised and lowered together by the cams $l$ on the main driving-shaft $b$ and the cams $m$, acting on the under side of the cam-blocks $n$, secured toward the front end of the horizontal side rods $i$. The cams $m$ are secured on the rocking shaft $p$, which is rocked by means of the lever $q$, connecting-rod $r$, and crank-pin $s$, secured in the wheel $t$, which latter gears with the wheel $u$ on the end of the main driving-shaft $b$.

$v$ (see Figs. 3, 4, and 6) is a cross-bar the ends of which are secured to the adjustable sliding blocks $w$, fitted capable of being slid on the horizontal side rods $i$, so that the cross-bar $v$ may be adjusted over the back edge of the pile of sheets $d$. Two sliding blocks $x$, Figs. 3 and 4, are fitted on the cross-bar $v$ in an adjustable manner, so that they can be adjusted with the depending presser-feet $z$ of the blocks $x$ immediately over the back corners of the pile of paper $d$. A double arm 1 is freely hinged to the upper part of the foot $z$ and carries at its longer end a rubber-covered roller 2, on which rests the end of a flat spring 3 for the purpose of giving the necessary pressure on the paper and to prevent rotation of the roller 2. The spring 3 is attached to a hinged block 4, so that by means of the set-screw 5 the pressure of the spring on the roller 2 can be regulated. To the opposite end of the arm is attached the vertical rod 6, the depression of which raises the roller 2 from the paper, and when raised sufficiently high the weighted catch 7, hinged between the double arm 1, catches in the notch 8 of the presser-foot and holds the roller 2 out of the way when a fresh pile of paper is being put into position. When the cross-bar $v$ is in the raised position, the double arm 1 hangs down nearer the vertical position, the then position of the roller 2 being indicated by the dotted circle $2^a$. (See Fig. 4.) As the cross-bar $v$ descends the roller 2 is pushed toward the center of the pile of paper, buckling up the topmost sheet S', as indicated in Fig. 4, and laying bare the corner of the next sheet $S^2$ below, and at the same time the presser-foot $z$ descends onto the exposed corner of the sheet $S^2$ and holds this sheet fast during the immediately-following drawing forward of the top sheet S'. Before the end of the downward movement of the cross-bar $v$, however, the lower end of the catch 7 reaches the top of the sheet $S^2$ and acts both as a fulcrum to tilt up the long side of the double arm 1, raising the roller 2 from the top of the sheet S', which might disturb the subsequent pulling forward of this sheet, and also as a stop to prevent the corner of the buckled-up sheet S' slipping back beneath the presser-foot $z$ before this reaches the sheet $S^2$ as the pressure of the roller 2 is being taken off the sheet S'.

The mechanism for drawing forward the top sheet is as follows:

Two main side levers 10 11 are pivoted at 12 on the outside to the side frames $a$ and are rocked by means of connecting-rods 13 from crank-pins 14, secured in the wheels $u$ on the ends of the main driving-shaft $b$. These side levers are formed in two parts 10 and 11, which are hinged together at 15, the object being to automatically adjust the stroke of the upper end of the levers to suit the position of the back edge of the pile of paper.

In the upper part of the side frames $a$ two horizontal slide or guide races 16 are formed, having a widened and dropped portion at the front end toward the feed-rollers. Sliding carriers 17 are fitted in these races 16 and connected to the upper ends 11 of the side levers by means of a pin 18, secured in the back plate 19 of the sliding carrier 17. The pin 18 projects through the slot 20, formed in the upper end 11 of the main side lever. Stop-brackets 21, cast on or secured to the adjustable sliding blocks $w$, limit the backward motion of the sliding carriers 17 to suit the position of the back edge of the pile of paper, the hinged joint 15 of the side levers permitting the connecting-rods 13 to follow the crank-pins 14 to the full extent of their backward movement. A strong flat spring 22 keeps the two parts 10 and 11 of the side levers in line at other times, being sufficiently strong to overcome the friction and inertia of the sliding carriers 17 in the slide-races 16.

The sliding carriers 17 carry between them a rubber-covered roller or bar 23, (see Figs. 3 and 5,) which extends across over the pile of paper and is provided at one end with a small ratchet-wheel 24. (See Fig. 5.) A catch 25, loosely hinged to the back plate 19 of the sliding carriers 17, permits the roller 23 to rotate as it is drawn back with the sliding carriers 17, but prevents its rotation during the forward movement. This roller 23 moves forward above and out of contact with the topmost of the undisturbed sheets S' of Fig. 4 until the sliding carriers 17 reach the dropped part of the races 16, when the roller 23 comes to rest on said sheet and causes it to partake of its forward movement, whereby the front edge of said sheet is fed into the grip of the feeding-rollers $e$.

The feeding-rollers $e$ are geared together by means of toothed wheels just inside the right-hand side frame and are rotated by means of the toothed wheel 26, Fig. 2, on the end of the top roller-shaft, toothed wheel 27 engaging with toothed wheel 26, ratchet-pins 28, secured between the face of the wheel 26, and a pin-plate 29 on the stud 30, carrying the wheel 27, a hook catch-rod 31, reciprocated from a crank-pin 32, attached to the wheel 33, which is geared with the wheel $u$ on the end of the driving-shaft $b$. The feed-rollers $e$ deliver the sheets to the carrying-tapes $f$, Fig. 3, which carry the sheets forward up to the impression-cylinder of the printing-machine.

In order to keep down the carrying speed, the above gearing is so proportioned that a sheet is carried forward only a short distance by each intermittent movement of the feed-rollers, so that the sheets are passed through and from the feed-rollers in a fanned-out or overlapping manner, as shown in Fig. 3. The first forward movement of each sheet, therefore, does not carry it past the pile, but leaves it in most cases covering more than half the sheet next below. It is necessary, therefore, to make provision for the passing of the drawing-forward roller or bar 23 beneath it in order to allow the roller 23 at the end of its next forward movement to act upon the next succeeding sheet. To effect this, a triangular-shaped lifter 34 (see Figs. 3, 5, and 6) is attached to a light rod 35, hinged at the ends in two plates 36, which latter are hinged on the cross-bar 37, carried by and between the sliding carriers 17. The plates 36 rest upon the top of the roller 23, and the front edge or apex of the lifter 34 rests directly on the top sheet or is carried by a steel strip 38, soldered on the upper side, the front end of which rests on the sheet. The lifter 34 is formed of very thin sheet metal, stiffened toward the front edge by wire 39. The forward movement of each sheet is always more than sufficient to bring the back edge of said sheet past the apex of the lifter 34 or the end of the strip 38 when the sliding carriers 17 are in their rearmost position. On the next forward movement of the sliding carriers 17 the strip 38 or the apex of the lifter 34 slides on the topmost of the undisturbed sheets, and on reaching the back edge of the last of the sheets moved forward it enters beneath the same and gradually lifts this and the overlying sheets up above the drawing-forward roller 23 as it moves forward.

A further provision for preventing any disturbance of the sheets below by the drawing forward of the top sheet consists of a holder 40, secured to the upper end of a vertical rod 41, sliding between guide-bars 42, hinged on the main shaft $b$. The rod 41 is raised by the cam 43 on the shaft $b$ and depressed by the spring 44 at the proper times. The object of hinging the guide-bars 42 is to enable them to be tilted back when a fresh pile of paper has to be inserted. To accommodate the rise and fall of the table $c$, the bars 42 are fitted in a metal-faced recess in the center of the back edge of the table $c$, said recess being opened or closed by tilting back or tilting down the hinged plate 45. The bars 42 are also carried below the shaft $b$ and the lower end locked by a lever 46, hinged to one side frame at 47 and extending across to the opposite frame for the purpose of steadying the bars 42 in a vertical position. The lever 46 is dropped to permit the lower ends of bars 42 to swing inward when a fresh pile of paper is to be put on the table.

The means for automatically raising the table consists of four vertical screws 48, actuated by the following mechanism: On one end of the shaft 49, extending from side to side across the machine, is fitted the ratchet-plate 50, which is intermittently rotated by means of the catch-pin 51 and catch-lever 52, hinged to the side lever 10. Longitudinal shafts 53 and bevel-gear 54 connect the four vertical screws 48 to the cross-shaft 49. An L-shaped lever 55, hinged at 56, Fig. 1, extends over the top of the side frame $a$ horizontally inward to the center of the machine, near the top edge of the front board 57, and carries at this end a feeler 58, which drops upon the top of the sheets when the sliding carriers 17 are at the rear portion of their stroke. The lower end of the vertical arm of the lever 55 enters an opening in a horizontal web 59, cast on the loosely-hinged cam-lever 60. The cam-lever 60 is fitted loosely on its pivot-stud 61, so that the end nearest the lever 55 can move slightly inward when pressed by the end of the lever 55. A spring-button 62 tends to force the cam-lever 60 outward as it is tilted upward past it by the end of the catch-lever 52 bearing against the under side of the web 59. When rotating the ratchet-plate 50, the catch-lever 52 rides upon a circular boss 63 behind the ratchet-plate. 64 is a flat spring to press down the cam-lever 60 on the back stroke of the catch-lever 52 and acts on the upper side of the web 59. A belly-shaped cam 65, formed on the outside of the cam-lever 60 and immediately beneath the web 59, tends to force the catch-lever 51 outward, so that the catch-pin 51 comes in line with the ratchet-plate 50, while the flat spring 70 tends to press the catch-lever 52 inward, so that the catch-pin 51 passes inside, behind, and out of contact with the ratchet-plate 50. When the top of the pile is sufficiently high or the table is raised to the top, the pile being exhausted the feeler 58 cannot drop as far as it otherwise would, so that the lower end of the lever 55 presses or holds the cam-lever 60 inward and keeps the belly-cam 65 sufficiently far back to prevent it forcing the end of the lever 52 outward, so that the action of the flat spring 70 keeps the lever 52 and the catch-pin 51 inward and the latter out of contact with the ratchet-plate 50, preventing any rotation of the latter, which would rotate the screws 48, to lift the table c. When the height of the pile is reduced sufficiently by removal of sheets, the feeler 58 descends so far that the lower end of the lever 55 presses or holds the cam-lever 60 outward and brings the belly-cam 65 so far forward that the latter forces the end of the catch-lever 52 as the end of the same moves forward past the cam outward, bringing the catch-pin 51 into engagement with the ratchet-plate 50, which is thereby partially rotated, causing a slight rotation of the screws 48 and a slight rise of the table c.

The mode of operating with the feeder is as follows: The lever 46 is dropped and the hinge-plate 45 thrown back, allowing the holder 40 to be drawn back. The rod 6 is depressed until the catch 7 rests in the notch 8 of the presser-foot and holds the roller 2 raised. The pile of paper is then placed upon the table c close against the front board 57, and by means of the set-screws 66 the cross-bar v is adjusted over the back edge of the pile. By means of the set-screws 67 the sliding blocks x are adjusted with the presser-feet over the back corners of the pile. The bars 42 are then swung up and secured in position. By means of the set-screw 68 the holder 40 is adjusted over the back of the pile. The rollers 2 are dropped upon the top sheet, and the machine can then be started. Immediately or slightly prior to the commencement of the forward stroke the bar v commences to descend and the rollers 2 to bend or buckle inward the back corners of the topmost sheet, and when the bar v has fully descended the presser-feet z are resting on the exposed corners of the second sheet, and the rollers 2 are raised from the paper, after which the bar v remains stationary for rather more than half a revolution of the driving-shaft b. During the latter part of the descent of the bar v the holder 40 has been raised, so that the back end of the topmost sheet has been freed. By this time the carrier-slides 17 have reached the commencement of the dropped portion of the races 16 and commence to fall until the rubber-covered roller 23 rests upon the front part of the top sheet and draws the sheet forward with it, delivering it before completing the forward movement into the grip of the feed-rollers e, which have just commenced to rotate. At this time the feeler 58 is held raised by a spring attached to the rocking shaft p and bearing against the under side of the lever 55 close to its attachment to the feeler; also, the holder 40 has dropped onto the top of the second sheet immediately the first sheet has moved sufficiently far for the back edge of the top sheet to be clear of the dropped holder 40. During the return of the sliding carriers 17 the roller 23 revolves over the top sheet while in contact with it, but is raised from it as the carriers 17 leave the dropped portion of the race, so that the continued feed of the feed-rollers is not hindered. As the sliding carriers 17 approach the back position the rotation of the feed-rollers stops, leaving the top sheet still covering the greater part of the pile when the feeler 58 descends. At the same time the cross-bar v is raised, lifting the presser-feet z and drawing back the rollers 2 nearer the back corners of the pile, and the holder 40 is dropped onto the back edge of the second sheet. On reaching the end of the back stroke the cross-bar v again begins to descend and continues to do so during the first part of the forward stroke, the rollers 2 buckling or bending the back edge of the second sheet, so as to expose the back corners of the third sheet. When the sliding carriers 17 have advanced sufficiently, which is soon after the commencement of the forward stroke, the front edge of the strip 38 or the apex of the lifter 34 reaches and passes beneath the center of the back edge of the top sheet, and in its further advance gradually lifts the whole length of the back edge of the top sheet, which slides up the incline of the lifter 34, and thus over the top of the roller 23, which is still moving forward above and out of contact with the second sheet. When the carrying-slides 17 therefore reach the dropped part of the races 16, the roller 23 descends onto the second sheet and draws it up into the grip of the feed-rollers e, which have just commenced to revolve and which then carry forward both the top and second sheets together, but with the top sheet overlapping the front edge of the second sheet a considerable distance. The other operations are repeated as previously described, the drawing-roller 23, however, moving back between the top and second sheets until clear of the advancing back edge of the top sheet, and the back edge of the second sheet occupying when the feed-rollers stop the position previously held by the edge of the top sheet. If the width of the sheets as measured across the feeder is considerable, two or more lifters 34 may be used in place of one. The rod 35 is hinged in the hinged plate 36 to permit the lifter 34 to be tilted over to the back of the roller or bar 23 when inserting a fresh pile; but this is not essential, as the rod 35 may be attached close to the back edge of the lifter 34 and hinged direct in the back plates 19.

I am aware that prior to my invention feeders for printing-machines have been made in which bending or buckling devices for separating one edge of the topmost sheet and exposing part of the next sheet, pushing or drawing rollers for pushing or drawing forward the separated sheets, automatically-lifted tables, and continuously or intermittently rotated feed-rollers have been used. I do not therefore claim a combination of such broadly; but

What I claim as my invention, and desire to secure by Letters Patent, is—

1. In a feeder for printing-machines, the combination of rising and falling side rods $i$, blocks $w$ adjustable on said rods $i$ and having stops 21, cross-bar $v$ carried by said blocks $w$, blocks $x$ carried by and adjustable on said cross-bar $v$, and carrying presser-feet $z$ and hinged arms $l$ provided with bending or buckling rollers 2, reciprocating sliding carriers 17, carrying drawing-roller 23 sheet-lifter 34 and pins 18, rocking levers 10 and 11 in two parts 10 and 11 hinged together, the upper part 11 having slot 20 in which said pin 18 engages, flat spring 22, connecting-rods 13, crank-pins 14, crank-pin wheels $u$ and driving-shaft $b$, all substantially as set forth and shown.

2. In a feeder for printing-machines, the combination of rocking side levers 10 11, formed in two parts hinged together and having each a slot 20 in the upper end and flat spring 22, adjustable stop 21, reciprocating sliding carriers 17, connected to said levers 10 11 by pins 18 engaging in the slots 20, horizontal slide-races 16, having dropped forward ends, drawing-roller 23, and inclined lifter 34 in front of said roller, both carried by said carriers 17, all substantially as described.

3. In a feeder for printing-machines, the combination of reciprocating sliding carriers 17, horizontal slide-races 16, having dropped ends, drawing-roller 23, carried by said carriers 17, and inclined lifter 34 carried in front of said roller 23, substantially as set forth and for the purpose specified.

4. In a feeder for printing-machines, the combination of rising and falling cross-bar $v$, adjustable blocks $x$, with depending notched presser-feet $z$ and hinged arms $l$, carrying buckling or bending rollers 2 and hinged catch 7, and adjustable spring 3, substantially as and for the purpose specified.

5. In a feeder for printing-machines, the combination of intermittently-rotated feed-rollers $e$, of comparatively short feed, sliding carriers 17, horizontal slide-races 16 having dropped ends, drawing-roller 23 carried by said carriers 17, and inclined lifter 34 carried in front of said roller 23, substantially as set forth and for the purpose specified.

6. In a feeder for printing-machines, the combination of cam-lifted vertical rods $g$ and $h$, horizontal side rods $i$ carried by said vertical rods, blocks $w$ adjustable on said side rods $i$, cross-bar $v$ carried by said blocks $w$, blocks $x$ adjustable on said cross-bar $v$, and having notched presser-feet $z$ and hinged arms $l$, carrying buckling or bending rollers 2 and hinged catch 7, and adjustable spring 3, all substantially as described and shown.

7. In a feeder for printing-machines, the combination of reciprocating carrying-slides 17, drawing-roller 23, ratchet-wheel 24, hinged ratchet-pawl 25, hinge-rod 35, and triangular-shaped sheet-lifter 34 attached to said hinge-rod 35, substantially as set forth and for the purpose specified.

8. In a feeder for printing-machines, the combination with a reciprocated sheet-drawing bar or roller 23 of a sheet lifter or lifters 34, carried in an inclined position in front of said bar or roller 23 and having its upper rear end extending over or partly over said bar or roller 23, substantially as set forth and for the purpose specified.

9. In a feeder for printing-machines, the combination of a rising and falling rod 41, carrying an adjustable holder 40, rising and falling cross-bar $v$, adjustable blocks $x$, with depending notched presser-feet $z$ and hinged arms $l$, carrying buckling or bending rollers 2 and hinged catch 7, and adjustable spring 3, all substantially as described and shown.

10. In a feeder for printing-machines, the combination of a screw-lifted table $c$, a rising and falling rod 41 carrying an adjustable holder 40, guide-bars 42, hinged on a cam-shaft $b$, and fitting in a recess formed in the rear edge of said table $c$, cam 43 and spring 44 for reciprocating said rod 41, and hinge-plate 45 closing said recess, all substantially as described and shown.

11. In a feeder for printing-machines, the combination of table $c$, screws 48, bevel-gear 54, side shafts 53, cross-shaft 49, ratchet-plate 50, reciprocated catch-lever 52, catch-pin 51, flat spring 70, hinged cam-lever 60, having belly-cam 65 and web 59 with opening in the free end, hinged L-shaped lever 55, with the lower end of its vertical arm entering said opening, and feeler 58 attached to the end of its horizontal arm, spring 69 attached to rocking shaft $p$, all substantially as set forth and shown, and for the purpose specified.

12. In a feeder for printing-machines, the combination of rocking side levers 10, catch-lever 52 having thereon a catch-pin 51, spring 70, ratchet-plate 50, hinged cam-lever 60, having a side cam 65 and an opening in its free end, hinged L-shaped lever 55, having the lower end of its vertical arm entering said opening and feeler 58 attached to the end of its horizontal arm, and rocking shaft $p$, with spring-lifter 69 all substantially as described and shown.

13. In a feeder for printing-machines, the combination of vertical rods $g$ and $h$, carrying horizontal side rods $i$, cam-shaft $b$, cams $l$, gear-wheels $u$ and $t$, crank-pin $s$ and the gear-wheel $t$, connecting-rod $r$, lever $q$, rocking shaft $p$, cams $m$ and cam-blocks $u$ on said side rods $i$, all for the purpose of lifting and lowering the side rods $i$ and its connections, all substantially as set forth.

WILLIAM KERSHAW.

Witnesses:
J. CLARK JEFFERSON,
JNO. ARTHUR TINKER.